(12) United States Patent
Baik et al.

(10) Patent No.: US 10,211,446 B2
(45) Date of Patent: Feb. 19, 2019

(54) RECHARGEABLE BATTERY

(71) Applicant: SAMSUNG SDI CO., LTD., Yongin-si, Gyeonggi-do (KR)

(72) Inventors: Yunki Baik, Yongin-si (KR); Jongwoo Nam, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 78 days.

(21) Appl. No.: 15/260,243

(22) Filed: Sep. 8, 2016

(65) Prior Publication Data

US 2017/0194617 A1 Jul. 6, 2017

(30) Foreign Application Priority Data

Jan. 4, 2016 (KR) .......................... 10-2016-0000511

(51) Int. Cl.
*H01M 2/34* (2006.01)
*H01M 2/06* (2006.01)
*H01M 2/22* (2006.01)
*H01M 2/30* (2006.01)
(Continued)

(52) U.S. Cl.
CPC ............... *H01M 2/34* (2013.01); *H01M 2/06* (2013.01); *H01M 2/22* (2013.01); *H01M 2/30* (2013.01); *H01M 2/1241* (2013.01); *H01M 2/365* (2013.01); *H01M 2200/00* (2013.01); *H01M 2200/20* (2013.01)

(58) Field of Classification Search
CPC ............ H01M 2/34; H01M 2/06; H01M 2/22; H01M 2/30; H01M 2/1241; H01M 2/365
See application file for complete search history.

(56) References Cited

U.S. PATENT DOCUMENTS

2012/0100420 A1* 4/2012 Byun .................... H01M 2/202
  429/179
2012/0225333 A1* 9/2012 Kim ...................... H01M 2/021
  429/61

(Continued)

FOREIGN PATENT DOCUMENTS

| JP | 2013-246966 A | 12/2013 |
| JP | 2014-112552 A | 6/2014 |
| JP | 2014-143001 A | 8/2014 |

(Continued)

*Primary Examiner* — Helen Oi K Conley
(74) *Attorney, Agent, or Firm* — Lewis Roca Rothgerber Christie LLP (57) ABSTRACT

A rechargeable battery includes: an electrode assembly including a first electrode and a second electrode; a first current collector plate electrically connected to the first electrode; a case accommodating the electrode assembly and having a top opening; a cap assembly including a cap plate sealing the top opening of the case; and a first terminal electrically connected to the first current collector plate and passing through and protruding above the cap plate. The first terminal includes: a first fastening terminal electrically connected to the first current collector plate and passing through and protruding above the cap plate, a first electrode terminal, one end of which is coupled to the first fastening terminal on the cap plate; and a first fixing member coupling another end of the first electrode terminal and electrically connecting the first electrode terminal and the cap plate to each other.

9 Claims, 4 Drawing Sheets

(51) Int. Cl.
*H01M 2/12* (2006.01)
*H01M 2/36* (2006.01)

(56) References Cited

U.S. PATENT DOCUMENTS

2013/0323574 A1* 12/2013 Tsunaki ............... H01M 2/206
                                            429/158
2015/0072221 A1*  3/2015 Han .................. H01M 2/30
                                            429/179

FOREIGN PATENT DOCUMENTS

KR   10-2012-0041877 A    5/2012
KR     1020120099919    *  3/2013  .............. H01M 2/34

\* cited by examiner

RECHARGEABLE BATTERY

CROSS-REFERENCE TO RELATED APPLICATION

This application claims priority to and the benefit of Korean Patent Application No. 10-2016-0000511, filed on Jan. 4, 2016 in the Korean Intellectual Property Office, and all the benefits accruing therefrom under 35 U.S.C. § 119, the content of which is incorporated herein by reference in its entirety.

BACKGROUND

1. Field

Aspects of the present invention relate to a rechargeable battery.

2. Description of the Related Art

Unlike primary batteries, which are not designed to be chargeable, secondary batteries are designed to chargeable and dischargeable. Low-capacity secondary batteries having a battery cell packaged in the form of a pack are widely used in small portable electronic devices, such as cellular phones or camcorders, and high-capacity secondary batteries having several tens of battery cells connected in the form of a battery pack are widely used as power sources for, as an example, driving motors of hybrid vehicles, etc.

Secondary batteries are manufactured in various shapes, for example, a cylindrical shape, a prismatic shape, and so on. A secondary battery is typically constructed by installing an electrode assembly, in which a positive electrode and a negative electrode with a separator interposed between the positive and negative electrodes, in a case with an electrolyte solution and installing a cap assembly having an electrode terminal in the case. Positive and negative terminals are connected to the electrode assembly and are exposed and protrude outside of the secondary battery through the cap plate.

SUMMARY

Embodiments of the present invention provide a rechargeable battery which has improved coupling force between an electrode terminal and a cap plate by coupling one end of the electrode terminal to the cap plate by a fastening terminal and fixing the other end of the electrode terminal to the cap plate by a fastening screw.

Embodiments of the present invention also provide a rechargeable battery which has improved electrical efficiency by electrically connecting a first electrode terminal to a first current collector plate through a first fastening terminal and to a cap plate through a first fixing member including stainless steel (SUS) and which can prevent or reduce damage by dissipating short-circuit current of the electrode assembly through the first fixing member when penetration damage occurs.

The above and other aspects of the present invention will be described in, or will be apparent from, the following description of exemplary embodiments.

According to an aspect of the present invention, there is provided a rechargeable battery including: an electrode assembly including a first electrode and a second electrode; a first current collector plate electrically connected to the first electrode; a case accommodating the electrode assembly and having a top opening; a cap assembly comprising a cap plate sealing the top opening of the case; and a first terminal electrically connected to the first current collector plate and passing through and protruding above the cap plate. The first terminal comprises: a first fastening terminal electrically connected to the first current collector plate and passing through and protruding above the cap plate; a first electrode terminal, one end of which is coupled to the first fastening terminal on the cap plate; and a first fixing member coupling another end of the first electrode terminal and electrically connecting the first electrode terminal and the cap plate to each other.

The first fixing member may be welded to a top surface of the cap plate.

The first terminal may further include a first fastening screw passing through another end of the first electrode terminal to be screw-coupled to a first coupling groove in the first fixing member.

The first terminal may further include a first insulation plate between the first electrode terminal and the cap plate.

The first insulation plate may include a first coupling opening passing through top and bottom surfaces thereof, and the first fixing member may be in the first coupling opening.

The first fixing member may include stainless steel (SUS).

The rechargeable battery may further include a second current collector plate electrically connected to the second electrode and a second terminal electrically connected to the second current collector plate and passing through and protruding above the cap plate.

The second terminal may include: a second fastening terminal electrically connected to the second current collector plate and passing through and protruding above the cap plate; a second electrode terminal, one end of which is coupled to the second fastening terminal on the cap plate; a second insulation plate between the second electrode terminal and the cap plate and having a second coupling opening under another end of the second electrode terminal; a second fixing member in the second coupling opening and between the other end of the second electrode terminal and the cap plate; and a second fastening screw passing through the other end of the second electrode terminal and screw-coupled to a second coupling groove in the second fixing member.

The second fixing member may include an insulating material.

According to another aspect of the present invention, there is provided a rechargeable battery including: an electrode assembly including a first electrode and a second electrode; a first current collector plate electrically connected to the first electrode; a case accommodating the electrode assembly and having a top opening; a cap assembly including a cap plate sealing the top opening of the case; and a first terminal electrically connected to the first current collector plate and passing through and protruding above the cap plate. The first terminal includes a first fastening terminal electrically connected to the first current collector plate and passing through and protruding above the cap plate, a first electrode terminal, one end of which is coupled to the first fastening terminal on the cap plate, and a first fastening screw passing through another end of the first electrode terminal and fixing the first electrode terminal to a top surface of the cap plate.

As described above, in the rechargeable battery according to an exemplary embodiment of the present invention, because one end of an electrode terminal is coupled to a cap plate by a fastening terminal and the other end of the electrode terminal is fixed to the cap plate by a fastening screw, a coupling force between the electrode terminal and the cap plate is improved.

BRIEF DESCRIPTION OF THE DRAWINGS

The above and other aspects and features of the present invention will become more apparent by describing, in detail, exemplary embodiments thereof with reference to the attached drawings, in which.

DETAILED DESCRIPTION

Hereinafter, exemplary embodiments of the present invention will be described, in detail, with reference to the accompanying drawings such that they can easily be made and used by those skilled in the art.

The present invention may, however, be embodied in many different forms and should not be construed as being limited to the exemplary embodiments set forth herein. Rather, these exemplary embodiments are provided so that this disclosure will be thorough and complete and will fully convey the aspects and features of the present invention to those skilled in the art, and the present invention will be defined by the appended claims and their equivalents.

In the drawings, the thicknesses of layers and regions may be exaggerated for clarity. Like numbers refer to like elements throughout. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. The term "exemplary" is intended to refer to an example or illustration. As used herein, the terms "use," "using," and "used" may be considered synonymous with the terms "utilize," "utilizing," and "utilized," respectively.

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of the stated features, integers, steps, operations, elements, and/or components but do not preclude the presence or addition of one or more other features, integers, steps, operations, elements, components, and/or groups thereof. It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

It will be further understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 1A:
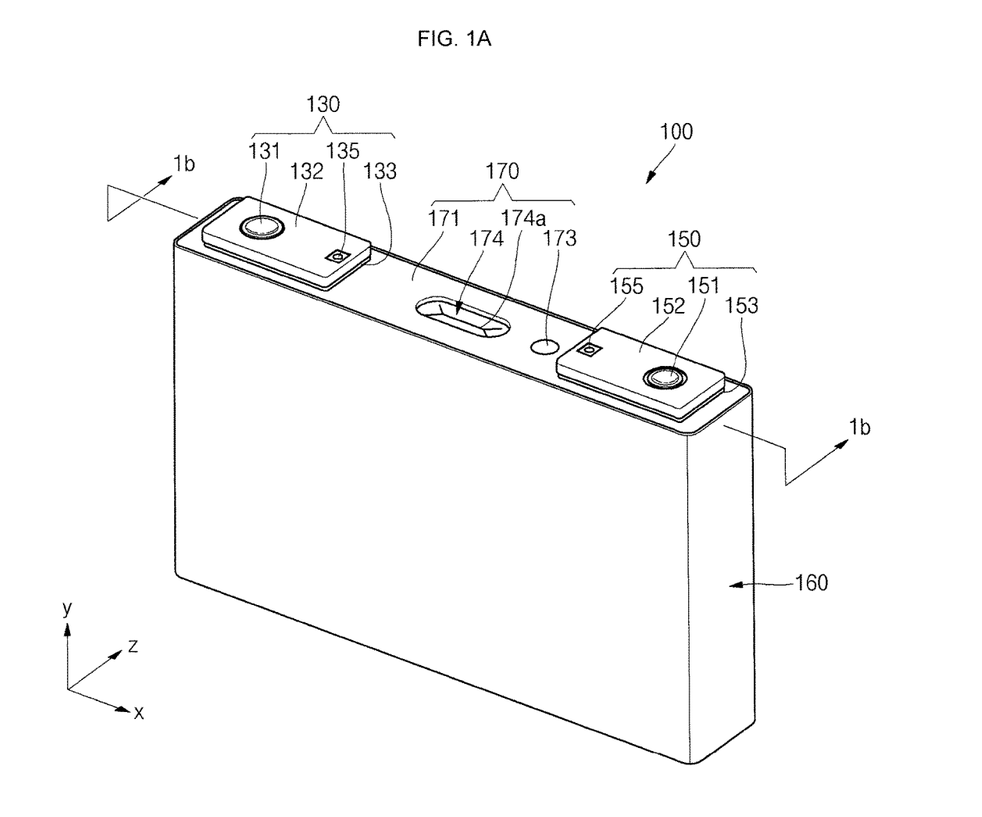
FIG. 1A is a perspective view of a rechargeable battery according to an embodiment of the present invention.
Figure 1B:
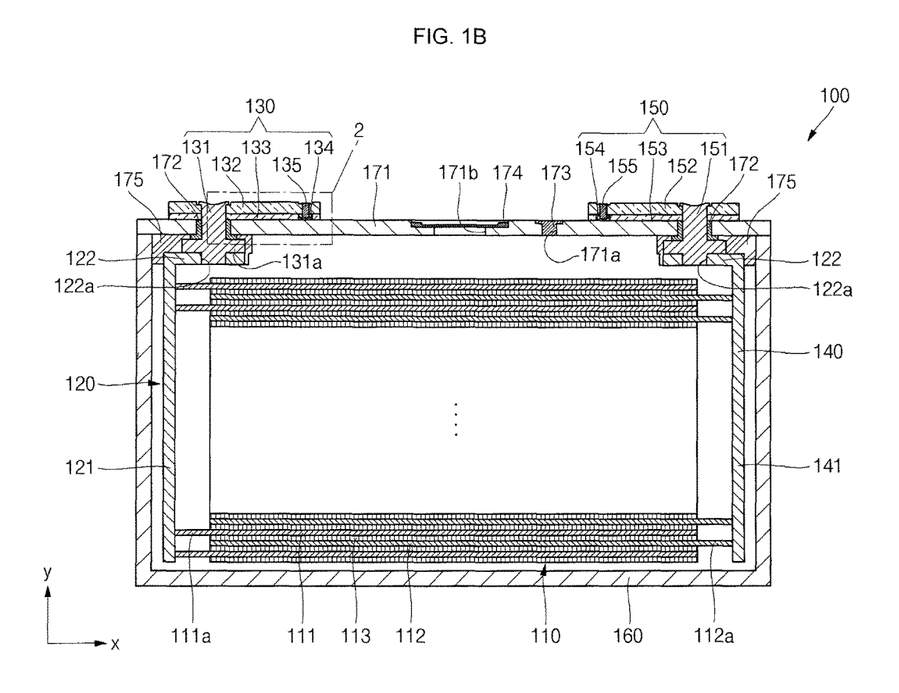
FIG. 1B is a cross-sectional view taken along the line 1b-1b of FIG. 1A.
Figure 2:
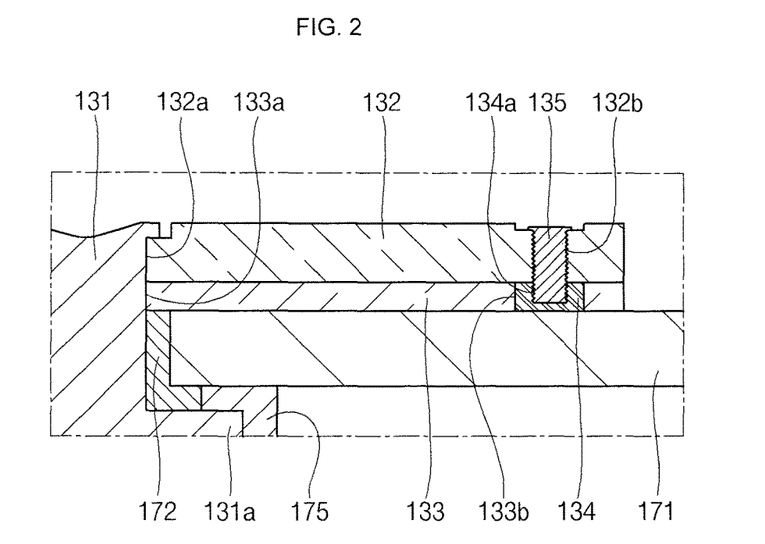
FIG. 2 is an enlarged view of the portion 2 of FIG. 1B.
Figure 3:
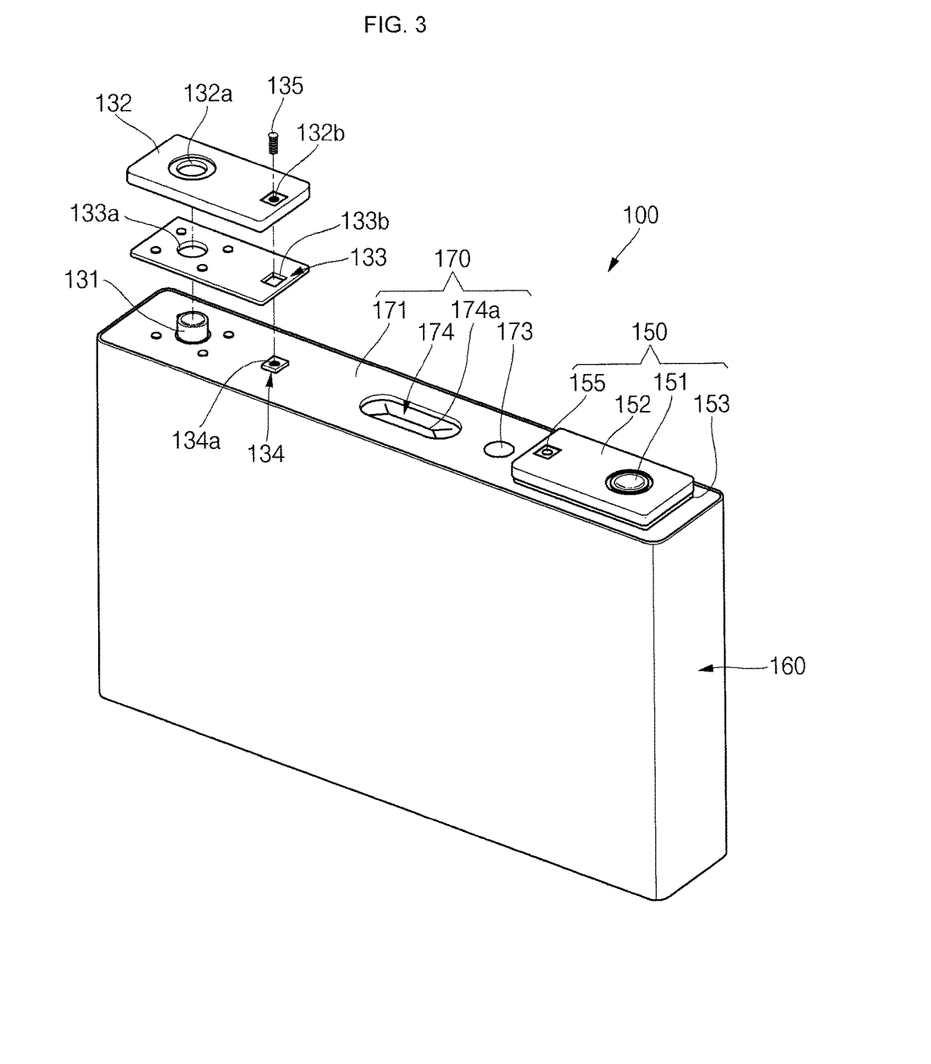
FIG. 3 is an exploded perspective view illustrating a first electrode terminal and a first insulation plate illustrated in FIG. 1A.

FIG. 1A is a perspective view of a rechargeable battery according to an embodiment of the present invention. FIG. 1B is a cross-sectional view taken along the line 1b-1b of FIG. 1A. FIG. 2 is an enlarged view of the portion 2 of FIG. 1B. FIG. 3 is an exploded perspective view illustrating a first electrode terminal and a first insulation plate illustrated in FIG. 1A. Hereinafter, the rechargeable battery according to an embodiment of the present invention will be described with reference to FIGS. 1A-3.

The rechargeable battery 100 according to an embodiment of the present invention includes an electrode assembly 110, a first current collector plate 120, a first terminal 130 (e.g., a first terminal portion), a second current collector plate 140, a second terminal 150 (e.g., a second terminal portion), a case 160, and a cap assembly 170.

The electrode assembly 110 is formed by winding or laminating a stacked structure of a first electrode 111, a separator 113, and a second electrode 112, each of which are thin plates or layers. In one embodiment, the first electrode 111 may function as a positive electrode and the second electrode 112 may function as a negative electrode. However, the present invention is not limited thereto, and in another embodiment, the first electrode 111 may function as the negative electrode and the second electrode 112 may function as the positive electrode.

The first electrode 111 is formed by coating a first electrode active material, such as a transition metal oxide, on a first electrode current collector including (e.g., made of) a metal foil, such as an aluminum foil. The first electrode 111 includes a first electrode uncoated portion 111a that is a region of the first electrode current collector without a first active material coated thereon. The first electrode uncoated portion 111a becomes a path for the flow of current between the first electrode 111 and outside of the first electrode 111. However, the first electrode 111 is not limited to the materials disclosed herein.

The second electrode 112 is formed by coating a second electrode active material, such as graphite or carbon, on a second electrode current collector including (e.g., made of)

a metal foil, such as a copper or nickel foil. The second electrode 112 includes a second electrode uncoated portion 112a that is a region of the second electrode current collector without a second active material coated thereon. The second electrode uncoated portion 112a becomes a path for the flow of current between the second electrode 112 and outside of the second electrode 112. However, the second electrode 112 is not limited to the materials disclosed herein.

The separator 113 is interposed between the first electrode 111 and the second electrode 112 to prevent an electrical short therebetween and to allow lithium ions to move therebetween. The separator 113 may include (e.g., may be made of) polyethylene, polypropylene, or a copolymer of polyethylene and polypropylene. However, the separator 113 is not limited to the materials disclosed herein.

The first current collector plate 120 and the second current collector plate 140 are respectively electrically connected to the first electrode 111 and the second electrode 112 at opposite ends of the electrode assembly 110. In one embodiment, the first current collector plate 120 and the second current collector plate 140 are respectively coupled to the first electrode uncoated portion 111a and the second electrode uncoated portion 112a at the opposite ends of the electrode assembly 110.

The electrode assembly 110 is accommodated in the case 160 together with an electrolyte solution. The electrolyte solution may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. The electrolyte solution may be a liquid, solid, or gel.

The first current collector plate 120 includes a first electrode connector portion 121 connected to the first electrode 111 and a first terminal connector portion 122 bent and extending from a top end of the first electrode connector portion 121 and connected to the first terminal 130.

The first electrode connector portion 121 contacts and is coupled to the first electrode uncoated portion 111a, which protrudes from one end of the electrode assembly 110, to be electrically connected to the first electrode 111. The first electrode connector portion 121 is welded to the first electrode uncoated portion 111a and is configured to extend (e.g., stand) vertically.

The first terminal connector portion 122 has a plate shape extending in a horizontal direction to be parallel with the cap plate 171 and includes a first terminal connector opening 122a (e.g., a first terminal connector hole) passing through a portion between top and bottom surfaces thereof (e.g., extending through the first terminal connector portion 122). A first fastening terminal 131 of the first terminal 130 is fitted into the first terminal connector opening 122a. For example, the first terminal connector opening 122a may be sized to correspond to the first fastening terminal 131 so as to accommodate the first fastening terminal 131. The first terminal connector portion 122 is welded to the first terminal portion 130 and may be interposed between the cap plate 171 of the cap assembly 170, to be further described later, and the electrode assembly 110. The first terminal connector portion 122 may be perpendicular to the first electrode connector portion 121.

The first terminal 130 includes (e.g., is generally made of) a metal or an equivalent thereof and is electrically connected to the first current collector plate 120. The first terminal 130 includes the first fastening terminal 131 accommodated in the first terminal connector opening 122a of the first current collector plate 120, a first electrode terminal 132 coupled to the first fastening terminal 131, a first insulation plate 133 interposed between the first electrode terminal 132 and the cap plate 171, a first fixing member 134 fixed to a top surface (e.g., a top surface) of the cap plate 171, and a first fastening screw 135 passing through the first electrode terminal 132 to be fixedly inserted into the first fixing member 134.

The first fastening terminal 131 passes through the cap plate 171, which will be further described later, to upwardly extend and protrude a length (e.g., a predetermined length) above the cap plate 171 and is electrically connected to the first current collector plate 120 under the cap plate 171. The first fastening terminal 131 may include a flange 131a laterally extending from the first fastening terminal 131 under the cap plate 171 to prevent the first fastening terminal 131 from being dislodged from the cap plate 171. A region under the flange 131a of the first fastening terminal 131 may be fitted into the first terminal connector opening 122a of the first current collector plate 120 and may be riveted or welded thereto. In addition, a region of the first fastening terminal 131 above the flange 131a may pass through the cap plate 171 to upwardly extend and protrude therefrom, and the first electrode terminal 132 may be fixed to the extended and protruded region of the first fastening terminal 131 above the flange 131a.

The first electrode terminal 132 has a first electrode terminal opening 132a (e.g., a first electrode terminal hole) and a first electrode fastening opening 132b (e.g., a first electrode fastening hole) passing through top and bottom surfaces of the first electrode terminal. In the first electrode terminal 132, the first electrode terminal opening 132a is provided at one end thereof in a lengthwise direction x of the cap plate 171, and the first electrode fastening opening 132b is provided at the other end in the first electrode terminal 132 in the lengthwise direction x of the cap plate 171. For example, the first electrode terminal opening 132a and the first electrode fastening opening 132b may be positioned at opposite ends of the first electrode terminal 132 in the lengthwise direction x of the cap plate 171.

The first electrode terminal opening 132a in the first electrode terminal 132 may be sized and shaped in a horizontal direction to correspond to the first fastening terminal 131 to accommodate the first fastening terminal 131. The first fastening terminal 131 upwardly protrudes from the cap plate 171, is fitted into the first electrode terminal opening 132a of the first electrode terminal 132, and is riveted or welded thereto.

The first electrode fastening opening 132b of the first electrode terminal 132 may be sized and shaped in the horizontal direction to correspond to the first fastening screw 135 to accommodate the first fastening screw 135. The first fastening screw 135 may be provided in and engaged with the first electrode fastening opening 132b. For example, the first fastening screw 135 may be screw-coupled to the first electrode terminal 132 at the first electrode fastening opening 132b.

The first fastening terminal 131 and the first electrode terminal 132 may include (e.g., may be made of), for example, aluminum, an aluminum alloy, or an equivalent thereof. However, the first fastening terminal 131 and the first electrode terminal 132 are not limited to the materials disclosed herein.

The first insulation plate 133 has a plate having a first insulation plate opening 133a (e.g., a first insulation plate hole) and a first coupling opening 133b (e.g., a first coupling hole) passing through top and bottom surfaces thereof. In the first insulation plate 133, the first insulation plate opening 133a is provided at one end thereof in the lengthwise direction x of the cap plate 171 and the first coupling opening 133b is provided at the other end of the first insulation plate 133 in the lengthwise direction x of the cap plate 171. For example, the first insulation plate opening 133a and the first coupling opening 133b may be positioned at opposite ends of the first insulation plate 133 in the lengthwise direction x of the first insulation plate 133. In addition, the first insulation plate opening 133a is provided at a position which corresponds to (e.g., at the same position as) the first electrode terminal opening 132a of the first electrode terminal 132, and the first coupling opening 133b is provided at a position which corresponds to (e.g., at the same position as) the first electrode fastening opening 132b of the first electrode terminal 132.

The first insulation plate opening 133a of the first insulation plate 133 may be sized and shaped in the horizontal direction to correspond to the first fastening terminal 131 to accommodate the first fastening terminal 131. The first fastening terminal 131 upwardly protrudes from the cap plate 171 and may be inserted into and coupled to the first insulation plate opening 133a of the first insulation plate 133. The first coupling opening 133b of the first insulation plate 133 may be sized and shaped in the horizontal direction to correspond to the first fixing member 134 to accommodate the first fixing member 134.

The first insulation plate 133 is interposed between the first electrode terminal 132 and the cap plate 171 and may insulate (e.g., electrically insulate) the first electrode terminal 132 and the cap plate 171 from each other. The first electrode terminal 132 is not directly electrically connected to the cap plate 171 due to the first insulation plate 133 but may be electrically connected to the cap plate 171 by the first fixing member 134 and the first fastening screw 135. In addition, the first insulation plate 133 contacts the top surface of the cap plate 171. Additionally, the first insulation plate 133 may also contact a seal gasket 172 to be further described later.

The first fixing member 134 may include a first fastening groove 134a extending a depth (e.g., a predetermined depth) from a top surface of the first fixing member 134 toward a bottom surface thereof. The first fixing member 134 is fixed to the top surface of the cap plate 171 and is engaged with (e.g., is in) the first coupling opening 133b of the first insulation plate 133. The first fixing member 134 may be fixedly welded to the top surface of the cap plate 171 at a position which corresponds to the first coupling opening 133b of first insulation plate 133.

The first fixing member 134 is inserted into the first coupling opening 133b provided in the first insulation plate 133. The first fixing member 134 may have the same or substantially the same thickness as the first insulation plate 133. For example, a top surface of the first fixing member 134 and a top surface of the first insulation plate 133 may be coplanarly positioned. In addition, similar to the first insulation plate 133, the first fixing member 134 may be interposed between the first electrode terminal 132 and the cap plate 171. For example, the top surface of the first fixing member 134 contacts (e.g., is connected to) the first electrode terminal 132, and the bottom surface of the first fixing member 134 contacts (e.g., is connected to) the cap plate 171 so that the first electrode terminal 132 and the cap plate 171 may be electrically connected to each other. The first fixing member 134 may include (e.g., may be made of) stainless steel (SUS). Thus, even if the electrode assembly 110 is short-circuited by a sharp object during, for example, a nail penetration test, short-circuit current may be dissipated by (e.g., consumed by) the SUS, which has relatively high resistance. Therefore, the first fixing member 134 may prevent explosion of or additional damage to the rechargeable battery 100 due to a relatively large amount of current due to penetration damage.

The first fastening groove 134a of the first fixing member 134 may be sized and shaped in the horizontal direction to correspond to the first fastening screw 135 to accommodate the first fastening screw 135. In addition, the first fastening groove 134a of the first fixing member 134 may be located and sized to correspond to the first electrode fastening opening 132b of the first electrode terminal 132. The first fastening screw 135 may be provided in and engaged with the first fastening groove 134a. For example, the first fastening screw 135 may be screw-coupled to the first fastening groove 134a of the first fixing member 134.

The first fastening screw 135 is inserted into the first electrode fastening opening 132b of the first electrode terminal 132 from above and then passes through the first electrode terminal 132 to be fixed with the first fixing member 134. For example, the first fastening screw 135 is screw-coupled to the first electrode fastening opening 132b of the first electrode terminal 132 from above and passes through the first electrode terminal 132 to be screw-coupled to the first fastening groove 134a of the first fixing member 134. The first fastening screw 135 may be made of a conductive material. The first fastening screw 135 is engaged with the first fixing member 134, thereby allowing the other end of the first electrode terminal 132 to be fixed to the top surface of the cap plate 171.

For example, one end of the first electrode terminal 132 may be coupled to the first fastening terminal 131 by riveting or welding and the other end of the first electrode terminal 132 may be screw-coupled to the cap plate 171 by the first fastening screw 135, thereby improving a coupling force between the first electrode terminal 132 and the cap plate 171. In addition, the first electrode terminal 132 is connected to the first current collector plate 120 through the first fastening terminal 131 and is electrically connected to the cap plate 171 through the first fixing member 134, thereby improving electrical efficiency and improving heat radiation efficiency.

The second current collector plate 140 includes a second electrode connector 141 (e.g., a second electrode connector portion) connected to the second electrode 112 and a second terminal connector portion 142 bent and extending from a top end of the second electrode connector portion 141. The second terminal connector portion 142 is connected to the second terminal 150. The second current collector plate 140 may include (e.g., may be made of) a conductive material, such as copper, a copper alloy, and an equivalents thereof. The second current collector plate 140 may have the same or substantially the same configuration as the first current collector plate 120.

The second terminal 150 generally includes (e.g., is generally made of) a metal or an equivalent thereof and is electrically connected to the second current collector plate 140. The second terminal 150 includes a second fastening terminal 151 accommodated in the second current collector plate 140, a second electrode terminal 152 coupled to the second fastening terminal 151, a second insulation plate 153 interposed between the second electrode terminal 152 and the cap plate 171, a second fixing member 154 fixed to the top surface of the cap plate 171, and a second fastening screw 155 passing through the second electrode terminal 152 to be fixedly inserted into the second fixing member 154. The second terminal 150 may have the same or substantially the same configuration as the first terminal 130. However, because the second fixing member 154 is made of an insulating material (e.g., an electrically insulating material), the second terminal portion 150 and the cap plate 171 may be electrically disconnected from each other. In addition, the second fastening terminal 151 and the second electrode terminal 152 of the second terminal 150 may include (e.g., may be made of) copper, a copper alloy, or an equivalent thereof.

The case 160 may be made of a conductive metal, such as aluminum, an aluminum alloy, or nickel-plated steel, and may have a substantially hexahedral shape having an opening through which the electrode assembly 110, the first current collector plate 120, and the second current collector plate 140 are inserted and placed. Because the case 160 and the cap assembly 170 are illustrated in FIGS. 1A and 1B in an assembled state, the opening is not visible but corresponds to a substantially opened portion of the periphery of the cap assembly 170. An interior surface of the case 160 is subjected to an insulation treatment to be insulated from the electrode assembly 110, the first current collector plate 120, and the second current collector plate 140.

The cap assembly 170 is coupled to the case 160. The cap assembly 170 includes the cap plate 171, the seal gasket 172, a plug 173, a safety vent 174, an upper insulation member 175, a lower insulation member 176, and a short-circuit plate 177.

The cap plate 171 seals the opening of the case 160 and is made of the same material as the case 160. The cap plate 171 may be coupled to the case 160 by, for example, laser welding. The cap plate 171 may be electrically connected to the first terminal 130 by the first fixing member 134, and the cap plate 171 and the first terminal 130 may have the same polarity. Accordingly, the cap plate 171 and the case 160 may also have the same polarity.

The seal gasket 172 is made of an insulating material, is arranged between each of the first fastening terminal 131 and the second fastening terminal 151 and the cap plate 171, and seals portions between each of the first fastening terminal 131 and the second fastening terminal 151 and the cap plate 171. The seal gasket 172 may prevent external moisture from penetrating into the rechargeable battery 100 and may prevent the electrolyte solution contained in the rechargeable battery 100 from flowing out.

The plug 173 seals an electrolyte injection opening 171a (e.g., an electrolyte injection hole) of the cap plate 171. The safety vent 174 may be installed in a vent opening 171b (e.g., a vent hole) of the cap plate 171 and may have a notch 174a configured to be opened at a certain pressure.

The insulation member 175 is arranged between each of the first current collector plate 120 and the second current collector plate 140 and the cap plate 171 and may prevent unintended electric shorts therebetween. For example, the insulation member 175 prevents electric shorts between the first current collector plate 120 and the cap plate 171 and between the second current collector plate 140 and the cap plate 171.

While a rechargeable battery according to an exemplary embodiment of the present invention has been particularly shown and described herein, it will be understood by those of ordinary skill in the art that various changes in form and details may be made therein without departing from the spirit and scope of the present invention as defined by the following claims and their equivalents.

What is claimed is:

1. A rechargeable battery comprising:
an electrode assembly comprising a first electrode and a second electrode;
a first current collector plate electrically connected to the first electrode;
a case accommodating the electrode assembly and having a top opening;
a cap assembly comprising a cap plate sealing the top opening of the case; and
a first terminal electrically connected to the first current collector plate and passing through and protruding above the cap plate, the first terminal comprising:
a first fastening terminal electrically connected to the first current collector plate and passing through and protruding above the cap plate;
a first electrode terminal, one end of which is directly coupled to the first fastening terminal on the cap plate;
a first fixing member coupled to the cap plate under another end of the first electrode terminal; and
a first fastening screw passing through the other end of the first electrode terminal and connected to the first fixing member to electrically connect the first electrode terminal and the cap plate to each other.

2. The rechargeable battery of claim 1, wherein the first fixing member is welded to a top surface of the cap plate.

3. The rechargeable battery of claim 1, wherein the first fastening screw is screw-coupled to a first coupling groove in the first fixing member.

4. The rechargeable battery of claim 1, wherein the first terminal further comprises a first insulation plate between the first electrode terminal and the cap plate.

5. The rechargeable battery of claim 4, wherein the first insulation plate comprises a first coupling opening passing through top and bottom surfaces thereof, and
wherein the first fixing member is in the first coupling opening.

6. The rechargeable battery of claim 1, wherein the first fixing member comprises stainless steel.

7. The rechargeable battery of claim 1, further comprising:
a second current collector plate electrically connected to the second electrode; and
a second terminal electrically connected to the second current collector plate and passing through and protruding above the cap plate.

8. The rechargeable battery of claim 7, wherein the second terminal comprises:
a second fastening terminal electrically connected to the second current collector plate and passing through and protruding above the cap plate;
a second electrode terminal, one end of which is coupled to the second fastening terminal on the cap plate;
a second insulation plate between the second electrode terminal and the cap plate and having a second coupling opening under another end of the second electrode terminal;
a second fixing member in the second coupling opening and between the other end of the second electrode terminal and the cap plate; and
a second fastening screw passing through the other end of the second electrode terminal and screw-coupled to a second coupling groove in the second fixing member.

9. The rechargeable battery of claim 8, wherein the second fixing member comprises an insulating material.

* * * * *